S. W. NELDNER.
TIRE RIM TOOL.
APPLICATION FILED MAY 13, 1920.
1,376,723. Patented May 3, 1921.
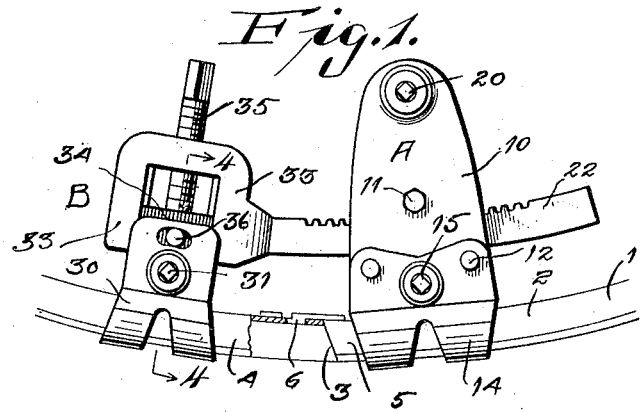
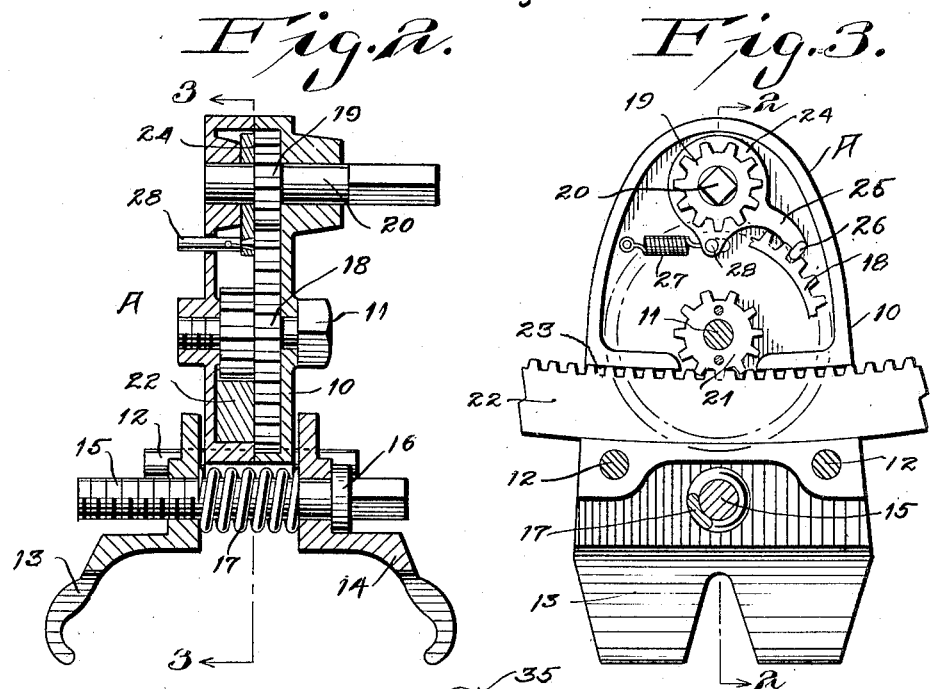
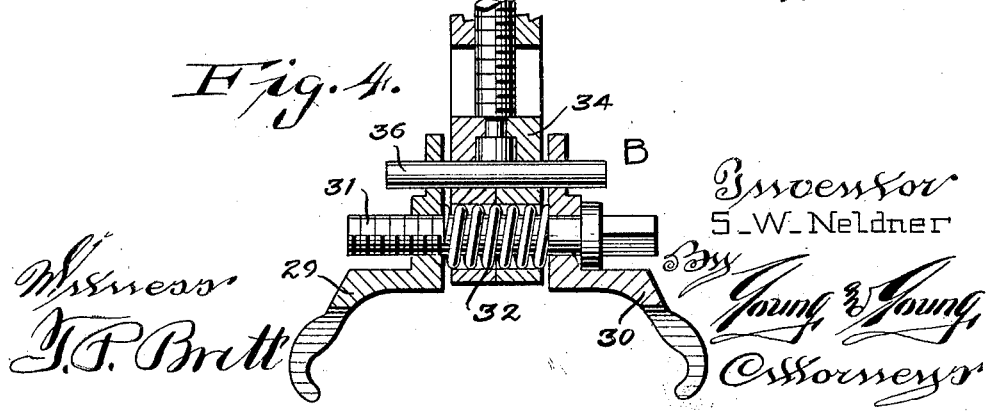
Inventor
S. W. Neldner

UNITED STATES PATENT OFFICE.

STEPHEN W. NELDNER, OF MILWAUKEE, WISCONSIN.

TIRE-RIM TOOL.

1,376,723.　　　　Specification of Letters Patent.　　Patented May 3, 1921.

Application filed May 13, 1920. Serial No. 380,931.

*To all whom it may concern:*

Be it known that I, STEPHEN W. NELDNER, a citizen of the United States, and resident of Milwaukee, in the county of Milwaukee and State of Wisconsin, have invented certain new and useful Improvements in Tire-Rim Tools, and do hereby declare that the following is a full, clear, and exact description thereof.

The invention relates to improvements in tools for use in removing and applying tires to split rims.

To remove or apply a tire to a split rim has been found to be a tedious and time-consuming operation due to the rigid nature of the rims and the consequent difficulty experienced in manipulating them with facility.

My invention aims to overcome the difficulties heretofore experienced in removing tires from and replacing them upon split or demountable rims by providing a tool so constructed and adapted to be so operated that the ends of the rim may be relatively moved to and held in any desired relation, or progressively and positively manipulated to facilitate the removal or replacement of a tire as may be desired.

In providing the improved tool, it has also been my aim to produce a cheap and simple structure, requiring a minimum of effort to quickly accomplish its purpose.

With the foregoing and other purposes in view, as will be apparent from a more complete understanding of the tool, my invention consists in the construction, combination and arrangement of parts, as will be more fully described hereinafter in connection with the accompanying drawings and then defined by the appended claims.

In the drawings:—

Figure 1 is a side elevation illustrating the use of my improved tire tool,

Fig. 2, a section on the line 2—2 of Fig. 3,

Fig. 3, a section on the line 3—3 of Fig. 2,

Fig. 4, a section on the line 4—4 of Fig. 1.

Referring to the drawings, 1 designates a portion of a rim having side flanges 2 and split at 3, either radially, or on a bias, as shown, its two abutting ends 4 and 5, respectively, being normally maintained in alinement by a lug 6 on a strap or plate fixed to one end of the rim and engaging a recess in the other end of the rim. Due to the stiffness of the material from which such rims are constructed much difficulty has been experienced in manipulating their ends in order that a tire may be removed from or applied to the rim with facility, and in order that the lug 6 may be disengaged from its recess, and the two ends of the rim moved relatively to desired positions with a minimum effort. I provide a pair of coacting clamp members A and B for association with the ends of the rim 4 and 5, respectively.

The member A comprises a housing 10 formed of two sections secured together by a bolt 11 and prevented from relative turning movement upon the bolt by pins 12, which pass through the two sections of the housing and extend beyond the sides thereof to provide guides for a pair of clamping jaws 13 and 14 shaped to receive therebetween the side flanges 2 of the rim. A screw 15 passes freely through an opening in one of the jaws and is threaded into an opening in the other jaw, being provided with a collar or head 16, which abuts against the first jaw and with a square end, whereby suitable means may be utilized to turn the same in order to move the jaws so that they may be clamped upon or released from engagement with the end of the rim. Surrounding the screw 15 is a coil spring 17 which constantly tends to move the jaws 13 and 14 relatively outward.

Free to turn on the bolt 11 is a pinion 18 and meshing with this pinion is a smaller pinion 19 fixed on a shaft 20 suitably journaled in the housing 10 and provided with a squared extremity arranged without the housing, whereby the pinions 19 and 18 may be rotated.

Formed integral with the pinion 18 or fixed thereto in any suitable manner, is a small pinion 21 which meshes with a rack bar 22, guided in an opening 23 in the housing 10. The rack bar, as is apparent, is moved by the pinion 21 upon rotation of the shaft 20, but is prevented from movement in any other direction by reason of its snug engagement with the walls of the opening 23.

A pawl to lock the pinion 18 and the rack bar 22, in any desired position, is provided in the form of a disk 24 freely rotatable on the shaft 20 and having projecting therefrom an arm 25 terminating in a lug 26 normally maintained in engagement with the pinion 18 by a spring 27 connected at one end to the disk and at the other end to the housing. To disengage the lug 26 from the gear 18, a pin 28 on the disk projects through a slot in the housing.

The member B consists of a pair of clamping jaws 29 and 30 in all respects duplicates of the jaws 13 and 14 of the member A. These jaws are operated by a bolt 31 similar to the bolt 15 and a coil spring 32 is interposed between them similarly to the spring 17 between the jaws 13 and 14.

The rack bar 22 provides a connection between the members A and B, and its end associated with the member B is formed into a substantially inverted U-shaped head, between the arms 33 of which is slidably arranged a block 34, which carries the clamping jaws 29 and 30. A screw 35 is swiveled to this block and passes through a threaded opening in the connecting portion of the U-shaped head. By this arrangement, the block and hence the jaws may be adjusted relatively to the rack bar. A pin 36 carried by the block 34, projects through openings in the jaws and prevents the jaws from turning excessively with respect to the block.

The operation of the tool is readily understood and is as follows: Member A is clamped to one end of the rim and member B to the other, and since the rack bar in any adjusted position maintains a substantially rigid engagement with the member A, the screw 35 may be operated to move the member B in such a direction that the two ends of the rim become disengaged and as a result, the lug 6 moves from its recess in the opposite end of the rim. After this operation the shaft 20 may be operated to move the members A and B to any desired position to facilitate the removal or application of a tire to the rim.

It will be further understood that the tool automatically locks the two ends of the rim in any adjusted position and that the structure enables the operator to move the ends of the rim positively and with little effort.

From the foregoing, it is thought that the construction, operation and many advantages of the herein described invention will be apparent to those skilled in the art, without further description; it is to be understood that various changes in the details of construction may be resorted to without departing from the spirit or sacrificing any of the advantages of the invention.

Having thus fully described my invention, what I claim as new, and desire to secure by Letters Patent, is:—

1. A rim tool comprising a pair of rim engaging members and a connecting bar, said bar being movable vertically upon one of said rim engaging members and movable longitudinally within the other.

2. A rim tool comprising a pair of rim engaging members and a connecting bar, said bar being rigidly held in a horizontal plane and adapted for movement in a vertical plane upon one of said members and movable longitudinally within the other.

3. A rim tool comprising a pair of rim engaging members and a connecting bar, said bar being vertically movable upon one of said rim engaging members by a threaded stem journaled therein and movable longitudinally within the other member.

In testimony that I claim the foregoing I have hereunto set my hand at Milwaukee, in the county of Milwaukee and State of Wisconsin.

STEPHEN W. NELDNER.